Sept. 6, 1927.　　　　　　　　　　　　　　　　　　1,641,758
W. S. H. HAMILTON
AUTOMATIC RECLOSING CIRCUIT BREAKER SYSTEM
Filed Dec. 27, 1923
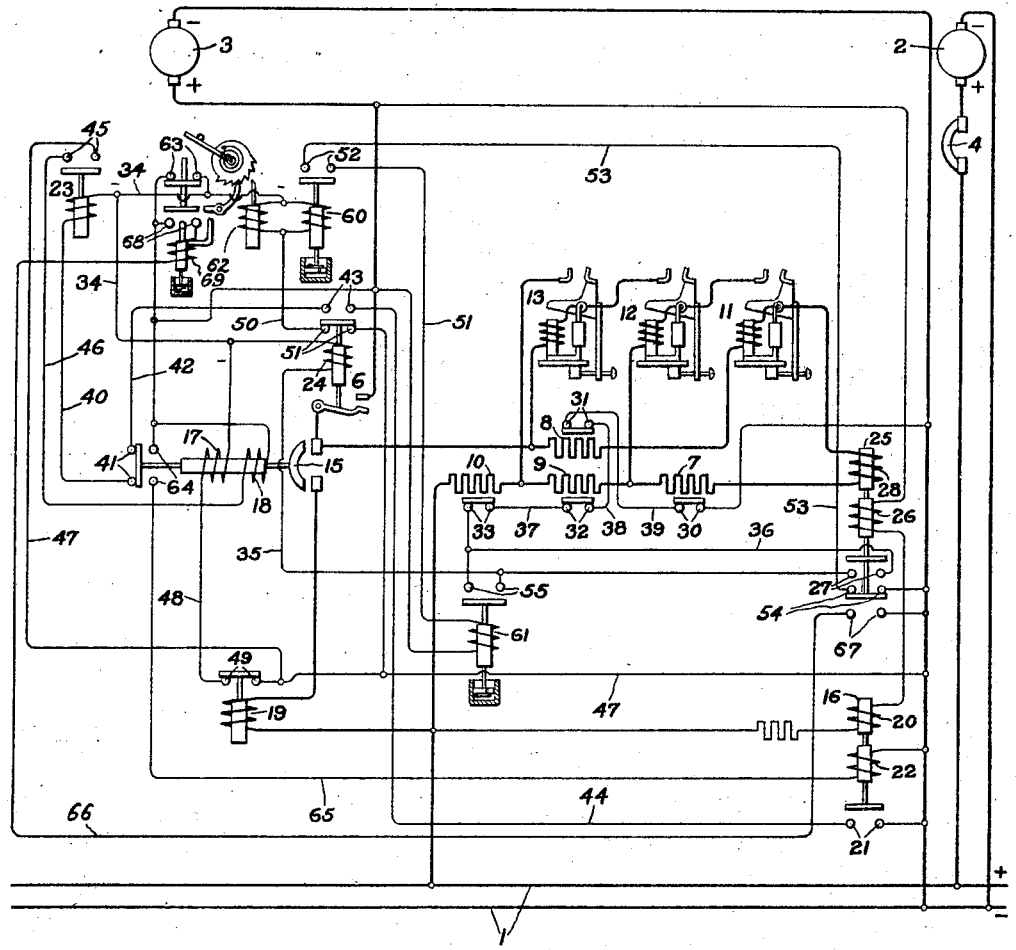
Inventor:
William S. H. Hamilton,
by *Alexander F. ____*
His Attorney.

Patented Sept. 6, 1927.

1,641,758

UNITED STATES PATENT OFFICE.

WILLIAM S. H. HAMILTON, OF SCHENECTADY, NEW YORK, ASSIGNOR TO GENERAL ELECTRIC COMPANY, A CORPORATION OF NEW YORK.

AUTOMATIC RECLOSING CIRCUIT-BREAKER SYSTEM.

Application filed December 27, 1923. Serial No. 683,061.

My invention relates to automatic reclosing circuit breaker systems and particularly to such systems which are adapted to control the connection between a supply circuit and a load circuit which is arranged to be energized at some other point, such for example as the trolley circuit of a railway system.

In most railway systems the voltage of the trolley circuit varies over a considerable range so that if a source of current having a predetermined voltage is directly connected to the trolley circuit when the voltage at the point where the source is to be connected is relatively low, the increase in the voltage of the trolley circuit, when the circuit breaker closes, may be great enough to pull a train apart, or, if the motors of the train are regenerating when the source is connected to the trolley circuit and the voltage of the trolley circuit is relatively high, the regenerative braking effect may be increased so much that the train will buckle. Also, the motors of the train may be damaged due to the motors flashing over.

One object of my invention is to provide an improved automatic reclosing circuit breaker system for such a system whereby, when the voltage difference between the source and the load circuit is more than a predetermined value, the voltage of the load circuit, to which the source is connected, is gradually changed so that the voltage difference between the source and the load circuit is less than a second predetermined value before the source is directly connected to the load circuit, and whereby the source is immediately connected directly to the load circuit when the voltage difference is less than said second predetermined value.

In accordance with this object of my invention the source is first connected to the load circuit through a current limiting resistor or other suitable current limiting means when the voltage difference between the source and the load circuit is less than a predetermined value. If the voltage difference between the source and the load circuit is greater than a second predetermined value after the source is connected to the load circuit through the current limiting means, this voltage difference is gradually decreased by short circuiting portions of the current limiting means until the voltage difference is less than said second predetermined value when all of the current limiting means is immediately short-circuited. The means for short circuiting all of the current limiting means is arranged to operate irrespectively of the amount of current limiting means connected in series between the source and load circuit so that the source is connected directly to the load circuit as soon as possible after the voltage difference is less than said second predetermined value. The current limiting means and the portions thereof which are arranged to be short circuited are so designed that the changes in the voltage of the load circuit produced by closing the circuit through the current limiting means, by short-circuiting each portion thereof, and by short circuiting all of the current limiting means are less than the predetermined amounts.

Another object of my invention is to provide an improved arrangement for controlling the amount of current supplied to the load circuit when a short circuit or overload is connected to the load circuit.

In accordance with this feature of my invention, the occurrence of a short circuit or overload effects the opening of the circuit breaker that short circuits the current limiting means. If, when this circuit breaker is open, the current through the current limiting means does not exceed a predetermined value, the current limiting means remains connected in series with the source and the load circuit until the short circuit or overload is removed when the current limiting means is short circuited to restore the normal connection between the source and the load circuit. In case, however, the short circuit or overload is so severe that, when the current limiting means is connected in series between the source and the load circuit, the current through the current limiting means exceeds a predetermined value the circuit breaker, which connects the current limiting means in series with the source and the load circuit, is opened and remains open until the voltage difference between the source and the load circuit is less than a predetermined value when the last mentioned circuit breaker is reclosed, thereby connecting the current limiting means in series with the source and the load circuit. In case, however, the short circuit or overload is not severe enough to effect the opening of the circuit breaker which connects the current limiting means in series with the source and the load circuit in the manner above described, but remains connected to the load circuit for a sufficient length of time so that the temperature of the current limiting means exceeds a predetermined value, this circuit breaker is opened and remains open until the temperature of the current limiting means decreases below a predetermined value when the circuit breaker is reclosed if the voltage difference is less than a predetermined value.

Another object of my invention is to provide an improved arrangement whereby the circuit breaker which connects the current limiting means in series with the source and the load circuit may be reclosed when the load circuit is not energized at some other point.

In accordance with this object of my invention, the circuit breaker which connects the load circuit to the source through the current limiting means is arranged to be reclosed automatically after said circuit breaker has been opened a predetermined length of time and irrespectively of the load conditions or the voltage difference between the source and the load circuit.

My invention will be better understood from the following description taken in connection with the accompanying drawing and its scope will be pointed out in the appended claims.

Referring to the drawing which shows one embodiment of my invention, 1 represents a load circuit which is arranged to be supplied with current at more than one point and 2 and 3 represent two sources of current which are adapted to supply current to the load circuit at different points. The source 2 is arranged to be connected to the load circuit by means of a circuit breaker 4 which may be of any suitable type. It is immaterial so far as my invention is concerned whether the circuit breaker 4 is automatically or manually controlled. The source 3 is arranged to be connected to the load circuit by an automatic reclosing circuit breaker system embodying my invention.

As heretofore described, if the load circuit 1 is a trolley circuit of a railway system it is very desirable that the connection between the source 3 and the load circuit should be controlled in such a manner, when the source is being connected to the load circuit, that the voltage of the load circuit is gradually varied so that the motors of the trains connected to the load circuit may be able to change their speeds to correspond to the variations in the load circuit voltage without producing any harmful results. In order to accomplish these desired results I provide a circuit breaker 6 which is arranged to be closed automatically when the voltage difference between the source 3 and the load circuit 1 is less than a predetermined value.

This circuit breaker, when it closes, connects the source 3 to the load circuit through suitable current limiting means, shown as four resistors 7, 8, 9 and 10. These resistors are designed so that the change in the voltage of the load circuit produced by the closing of the circuit breaker 6 does not exceed a predetermined amount. As the load circuit voltage becomes more nearly equal to the voltage of the source 3 after the circuit breaker 6 is closed, the current through the resistors decreases and the series contactors 11, 12 and 13, which are arranged to be connected in series with the source 3, short circuit the resistors 7, 8 and 9 when the current through the resistors decreases below predetermined values.

When the voltage difference between the source and the load circuit is less than a predetermined value, it is evident that the source may be connected directly to the load circuit without producing any harmful results. Moreover, it is evident that this connection should be made as soon as possible under such conditions, as it is not desirable to have to wait until the series contactors 11, 12 and 13 which operate in succession, have time to operate. For accomplishing these results, I provide a circuit breaker 15 which may be of any suitable type and which is controlled by a relay 16 so that it closes irrespectively of the amount of current limiting means in the circuit when the voltage difference between the source and the load circuit is less than a predetermined value. The circuit breaker 15 short circuits all of the resistors 7, 8, 9 and 10 so that when both of the circuit breakers 6 and 15 are closed the source 3 is directly connected to the load circuit 1.

As shown, the circuit breaker 15 is of the well known type which is provided with a holding coil 17 and a closing coil 18, the closing coil 18 being arranged, when energized, to close the circuit breaker and the holding coil 17 being arranged, when energized, to maintain the circuit breaker closed after the closing coil is deenergized. The circuit of the holding coil 17 is controlled by an overload relay 19 which is connected and arranged so that the circuit of the holding coil is opened to effect the opening of the circuit breaker 15 when the current supplied from the source 3 to the load circuit through the circuit breaker 15 exceeds a predetermined value. The relay 16, which controls the circuit of the closing coil 18 of the circuit breaker 15, is provided with a winding 20 which is arranged to be connected between the source 3 and the load circuit 1 when the circuit breaker 15 is open so that the voltage impressed thereon varies in accordance with the difference between the voltages of the source and the load circuit. The winding 20 is designed so that when the contacts 21 of the relay 16 are open the winding 20 maintains the contacts 21 open, in order to prevent the energization of the closing coil 18 of the circuit breaker until the voltage between the source and the load circuit is less than a predetermined value. In order that the contacts 21 of the relay 16 may be open when the circuit breaker 15 opens, the relay 16 is provided with a second winding 22 which is arranged to be energized when the circuit breaker 15 is closed and which when energized, opens the contacts 21. The windings 20 and 22 are preferably arranged on separate cores so that both windings, when energized, always tend to maintain the contacts 21 open. In order that the contacts 21 may not have to carry very much current, these contacts, instead of being directly in the circuit of the closing coil 18, which takes considerable current, are in the circuit of an auxiliary relay 23 which, in turn, controls the contacts 45 in the circuit of the closing coil 18.

The circuit breaker 6 is shown as a contactor having a closing coil 24 which, when energized, closes the contactor and which maintains the contactor closed as long as it is energized. The circuit of the closing coil 24 is controlled by a relay 25 having a coil 26 which is arranged to be connected between the source and the load circuit when the circuit breaker 6 is open so that the relay 25 can close only when the voltage difference between the source and the load circuit is less than a predetermined value. As shown the coils 20 and 26 of the relays 16 and 25 are connected in series.

In order to protect the source 3 against an excessive overload when the circuit breaker 6 is closed and current is being supplied through the current limiting resistors, the relay 25 is provided with a second coil 28 which is connected in series with the resistor 7 and which is arranged when sufficiently energized to open the contacts 27 of the relay 25 which are in the circuit of the closing coil 24 of the circuit breaker 6. In order that the amount of current required to cause the relay 25 to open its contacts may be the same irrespectively of the direction of current through the coil 28, it is preferable to design the relay 25 in any suitable manner so that when both coils are energized both tend to open the contacts 27. One well known arrangement for accomplishing this result, in which each coil is provided with a separate core, is shown in the drawing.

After the circuit breaker 6 opens due to the opening of the contacts 27, the coil 26 maintains the contacts 27 open until the voltage difference between the source and the load circuit is less than a predetermined value.

In order to prevent the resistors from becoming too hot when the circuit breaker 6 is closed and the circuit breaker 15 is open, when there is an overload connected to the load circuit, which lasts for a considerable length of time, contacts 30, 31, 32 and 33 are provided in the circuit of the closing coil 24 of the circuit breaker 6 and are arranged to be controlled by thermostats placed in thermal relation with the resistors 7, 8, 9 and 10 respectively. In case the temperature of any one of the resistors exceeds a predetermined value, the thermostat associated therewith opens its contacts so that the coil 24 is deenergized and the circuit breaker 6 opens. After the overheated resistor cools, the thermostat associated therewith closes its contacts and the circuit breaker 6 closes, provided the voltage difference between the source and the load current is less than a predetermined value so that the contacts 27 of the relay 25 are closed.

It is evident that if for any reason the load circuit is not energized from some other source when the circuit breaker 6 is open, and there is a load of appreciable magnitude connected to the load circuit, the voltage difference between the source and the load circuit is nearly equal to the voltage of the source as the resistance of the windings 20 and 26 is very much greater than the normal load resistance. Since it is necessary to design the winding 26 so that the contacts 27 are not closed until the voltage difference is very much smaller than the voltage of the source 3, it is evident that if no other means were provided for effecting the closing of the circuit breaker 6, it would remain open until the load circuit is again energized at some other point although the load conditions may be such that the source 3 can be connected to the load circuit without overloading the source. As it is usually desirable, however, to have the load circuit continuously energized, I provide in addition to the reclosing arrangement heretofore described, means whereby after the circuit breaker 6 has been opened for a certain length of time, this circuit breaker is closed irrespectively of the relative voltages of the source and the load circuit. This means is shown as comprising a time relay 60 which is arranged to be energized when the circuit breaker 6 opens. After a predetermined time this relay closes its contacts and effects the completion of a circuit for the closing coil 24 of the circuit breaker 6, which is independent of the contacts 27 of the contactor 25. This circuit is completed by a relay 61, the circuit of which is controlled by the relay 60. The relay 61 is preferably designed so that it does not open its contacts until after its coil has been deenergized for a certain length of time.

In order to prevent the circuit breaker 6 from being reclosed more than a predetermined number of times by the time relay 60, I also provide a notching relay 62 which may be of any suitable construction and which is arranged to be actuated each time the circuit breaker 6 opens. The contacts of the relay 62 are so arranged that, after the circuit breaker 6 has been opened a predetermined number of times, contacts 63 are opened so as to keep the circuit breakers 6 and 15 open. The same action of relay 62 which opens contacts 63 also closes contacts 68 and this in turn allows a reset coil 69 to be energized whenever relay 25 closes contacts 67 which close at the same time as contacts 27. The reset coil 69 is adapted to reset the relay 62, and close contacts 63 again. It will thus be seen that, while circuit breaker 6 is only allowed to close a predetermined number of times with one setting of the relays 60 and 62, the system is so arranged that the subsequent closing of the contacts 67 of relay 25 during the aforesaid condition, causes circuit breaker 6 to close and the other apparatus to resume normal operation as previously described.

The operation of the system shown in the drawing is as follows: Let it be assumed that the circuit breaker 4 is closed so that the load circuit 1 is energized by the source 2, and that the circuit breakers 6 and 15 have just opened. The windings 20 and 26 of the relays 16 and 25 respectively are therefore energized in accordance with the difference in the voltages of source 3 and the load circuit 1. If the voltage difference is below a predetermined value, the relay 25 closes its contacts 27. If the voltage difference is below a second predetermined value, which is much lower than the first predetermined value, the relay 16 closes its contacts 21. Let it be assumed that the voltage difference is less than the first predetermined value so that the relay 25 closes its contacts 27. A circuit is then completed from the positive terminal of the source 3, through the contacts 63 of the notching relay 62, conductor 34, closing coil 24 of the circuit breaker 6, conductor 35, contacts 27 of the relay 25, conductor 36, thermostat contacts 33, conductor 37, thermostat contacts 32, conductor 38, thermostat contacts 31, conductor 39, thermostat contacts 30 to the negative terminal of the source 3. The closing of the circuit breaker 6 completes a circuit between the positive terminal of the source 3 and the positive side of the load circuit. This circuit includes the load limiting resistors 7, 8, 9 and 10, the coil of the series contactor 11 and the coil 28 of the relay 25. If the current supplied to the load circuit exceeds a predetermined value, after the circuit breaker 6 closes, the winding 28 causes the relay 25 to open its contacts 27 so that the circuit breaker 6 is opened. If, however, the current supplied to the load circuit does not exceed this predetermined value, the circuit breaker 6 remains closed. When the current through the resistors 7, 8, 9 and 10 decreases below a predetermined value the series contactor 11 operates in a manner well known in the art and closes its contacts which completes a short circuit around the resistor 7 and the coil 28. This short circuit includes the coil of the series contactor 12.

If the load conditions are such that after the resistor 7 is short circuited, the current through the resistors 8, 9 and 10 decreases below a predetermined value, the series contactor 12 closes its contacts and completes a short circuit around the resistors 7 and 8, the coil 28 of the relay 25 and the coil of the series contactor 11. This last mentioned short circuit includes the coil of the series contactor 13. When the load conditions are such that the current through resistors 9 and 10 and the coil of the series contactor 13 decreases below a predetermined value, this series contactor 13 closes its contacts and completes a short circuit around the resistors 7, 8 and 9, the coils of the series contactors 11 and 12, and the coil 28 of the relay 25. This short circuit includes the coil of the series contactor 13 so that it maintains its contacts closed.

If at any time while the circuit breaker 15 is open, the voltage difference between the source 3 and the load circuit is less than a predetermined value so that the source may be connected directly to the load circuit without producing too great a change in the voltage of the load circuit, the relay 16 closes its contacts 21, thereby completing a circuit for the relay 23 which in turn completes a circuit for the closing coil 18 of the circuit breaker 15. The circuit of the relay 23 is from the positive terminal of the source 3 through the contacts 63 of the notching relay 62, conductor 34, winding of the relay 23, conductor 40, auxiliary contacts 41 on the circuit breaker 15, conductor 42, auxiliary contacts 43 on the circuit breaker 6, which are closed when the circuit breaker is closed, conductor 44, contacts 21 of the relay 16 to the negative terminal of the source 3. The closing of the contacts 45 of the relay 23 completes a circuit for the closing coil 18 of the circuit breaker 15 from the positive terminal of the source 3, through the closing coil 18, conductor 46, contacts 45 of the relay 23, conductor 47 to the negative terminal of the source 3. The closing of the circuit breaker 15 connects the source 3 directly to the load circuit. The opening of the auxiliary contacts 41, when the circuit breaker 15 closes, deenergizes the relay 23 which in turn opens its contacts 45 and deenergizes the closing coil 18. The circuit breaker 15, however, is held in its closed position by the holding coil 17, the circuit of which is from the positive terminal of the source 3, through contacts 63 of the notching relay 62, conductor 34, holding coil 17, conductor 48, contacts 49 of the overload relay 19, conductor 47 to the negative terminal of the source 3. The closing of the auxiliary contacts 64 on the circuit breaker 15, when it closes, completes the circuit of the coil 22 of the relay 16 so that contacts 21 are opened. The circuit of the coil 22 is from the positive terminal of the source 3, through contacts 64, conductor 65, coil 22 to the negative terminal of the source 3.

From the above description, it is evident that when both of the circuit breakers 6 and 15 are open, the circuit breaker 6 is closed when the voltage difference between the source and the load circuit is less than a predetermined value, and after the circuit breaker 6 is closed the circuit breaker 15 is closed when the voltage difference is less than a second predetermined value irrespectively of the amount of current limiting means connected in series between the source 3 and the load circuit 1. If the voltage difference is relatively great when the circuit breaker 6 closes, the voltage of the load circuit is gradually changed by short circuiting the resistors successively by the series contactors 11, 12 and 13 so as to make the difference between the voltages of the source and load circuit equal to a second predetermined value before the circuit breaker 15 closes. If, however, the difference between the voltages of the source and load circuit is less than the second predetermined value, when the circuit breaker 6 is closed, the circuit breaker 15 is immediately closed so as to connect the source directly to the load circuit.

It will be observed that this arrangement of controlling the connection between the source 3 and the load circuit 1 is operative in the manner above described when the voltage of the load circuit is greater than the voltage of the source to be connected thereto as well as when the voltage of the load circuit is less than the voltage of the source. Therefore, it is evident that this arrangement also permits the source 3 to be connected to the load circuit 1 when there are machines connected to the load circuit which are adapted to supply power to the source as would be the case if there were locomotives connected to the load circuit which were regenerating.

When the circuit breakers 6 and 15 are closed and an overload or short circuit occurs on the load circuit 1, the overload relay 19 opens its contacts 49 and deenergizes the holding coil 17 of the circuit breaker 15. The opening of the circuit breaker inserts the resistors 7, 8, 9 and 10 and the relay coil 28 in series with the source 3 and the load circuit 1.

If the overload or short circuit remains connected to the load circuit after the circuit breaker opens and is severe enough, the winding 28 of the relay 25 opens the contacts 27 in the circuit of the closing coil 24 of the circuit breaker 6 so that this circuit breaker opens.

After the short circuit or overload has been removed or has decreased the circuit breakers 6 and 15 reclose in the manner heretofore described provided the load circuit is supplied from some other source so that the voltage difference between the source and the load circuit can decrease below the predetermined value at which the contactor 25 closes its contacts 27.

If there is no other source connected to load circuit 1, when the circuit breaker 6 is open, and there is a load of appreciable magnitude connected to load circuit 1, this circuit breaker is arranged to be closed in the following manner irrespectively of the load conditions. When the circuit breaker 6 opens a circuit is completed for the time relay 60. This circuit is from the positive terminal of the source 3 through contacts 63 of the notching relay 62, conductor 34, winding of relay 60, conductor 50, contacts 51 of the circuit breaker 6 which are closed when the circuit breaker is open, conductor 47 to the negative terminal of the source 3. The time relay 60 is arranged in any well known manner, as by means of a dash pot, so that it does not close its contacts until a predetermined time after the coil of the relay is energized. When the relay 60 closes its contacts 52, a circuit is completed for the relay 61, this circuit being from the positive terminal of the source 3, through the winding of the relay 61, conductor 51, contacts 52 of the relay 60, conductor 53, contacts 54 of the relay 25 to the negative terminal of the source 3. The closing of the contacts 55 of the relay 61 completes a circuit around the contacts 27 of the relay 25 so that the closing coil 24 of the circuit breaker 6 is energized. The series contactors 11, 12 and 13 and the contactors 16, and 25 then operate in the manner heretofore described if there is not such an excessive overload or short circuit connected to the load circuit when the circuit breaker 6 closes as to cause the winding 28 of the relay 25 to open its contacts 27 and effect the opening of the circuit breaker 6. When the circuit breaker 6 closes the opening of its auxiliary contacts 51 deenergizes the time relay 60 which is arranged to open its contacts as soon as the winding thereof is deenergized. Therefore if the relay 25 effects the opening of the circuit breaker, the time relay 60 is again energized and the above cycle of operation is repeated.

In order to limit the number of times the circuit breaker 6 can be reclosed on a short circuit, I provide the notching relay 62, the winding of which is connected in parallel with the winding of the time relay 60. Therefore the notching relay is energized each time the circuit breaker 6 is opened. This notching relay may be of any suitable type which opens its contacts 63 after the winding thereof has been energized a predetermined number of times.

Since these contacts are in the circuits of windings of the relays 23, 60, and 62, the closing coil 24 of the circuit breaker 6 and the holding coil 17 of the circuit breaker 15, it is evident that when these contacts are opened the automatic reclosing equipment is rendered inoperative.

The contacts 63 of the notching relay 62 are arranged to be reclosed by a reset coil 69. This can be energized when relay 25 closes its contacts 67. The circuit for the reset coil 69, is from the positive terminal of the source 3 through contacts 68 of notching relay 62, reset coil 69, conductor 66, contacts 67 of relay 25 to the negative side of the source 3.

By allowing relay 63 to be reset in this manner, normal operation of the system can be resumed whenever the relay 25 indicates by closing contacts 67 that the voltage difference between the source 3 and the load circuit 1 is less than a predetermined amount. Should this condition not occur, however, and relay 25 should maintain contacts 67 open, then it would be necessary to manually reset notching relay 62 to thereby close the contacts 63 before normal operation of the system could be resumed.

If, at any time while the resistors are connected in series with the source 3 and the load circuit, the temperature of any one of these resistors exceeds a predetermined value, the thermostat associated therewith opens its contacts, thereby opening the heretofore described circuit of the closing coil 24 of the circuit breaker 6 so that this circuit breaker opens. After the overheated resistor cools so that its associated thermostat closes its contacts, the circuit breaker 6 is reclosed in the manner heretofore described.

Furthermore, it is evident that if, at any time when the circuit breaker 6 is open, there is no load connected across the load circuit 1, the circuit breakers 6 and 15 will close at once as the relays 16 and 25 will have no current through their respective coils 20 and 26 and, therefore, the closing circuits of circuit breakers will be closed in the manner heretofore described.

While I have shown and described only one embodiment of my invention, I do not desire to be limited thereto but seek to cover in the appended claims all those modifications that fall within the true spirit and scope of my invention.

What I claim as new and desire to secure by Letters Patent, is:—

1. In an automatic reclosing circuit breaker system, a supply circuit, a load circuit, current limiting means, a circuit breaker arranged when closed to connect said current limiting means in series between said supply circuit and load circuit, a second circuit breaker arranged when closed to short circuit said current limiting means, means responsive to a predetermined relation between the voltages of said supply circuit and said load circuit when said first mentioned circuit breaker is open for effecting the closing of said first mentioned circuit breaker, and means responsive to another predetermined relation between the voltages of said supply circuit and said load circuit when said first mentioned circuit breaker is closed and said second mentioned circuit breaker is open for effecting the closing of said second mentioned circuit breaker.

2. In an automatic reclosing circuit breaker system, a supply circuit, a load circuit, current limiting means, a circuit breaker arranged when closed to connect said current limiting means in series between said supply circuit and load circuit, a second circuit breaker arranged when closed to short circuit said current limiting means, means responsive to the voltage difference between said supply circuit and said load circuit when said first mentioned circuit breaker is open for controlling the closing of said circuit breaker, and means responsive to the voltage difference between said supply circuit and said load circuit when said first mentioned circuit breaker is closed for controlling the closing of said second mentioned circuit breaker.

3. In an automatic reclosing circuit breaker system a supply circuit, a load circuit, current limiting means, a circuit breaker arranged to connect said current limiting means in series between said supply and load circuits, means for effecting the opening of said circuit breaker when the current through said current limiting means exceeds a predetermined value and for effecting the closing of said circuit breaker when the difference between the voltages of said supply and load circuits is less than a predetermined value, and means controlled by the current through said current limiting means for varying the amount of current limiting means connected in series with said supply and load circuits.

4. In an automatic reclosing circuit breaker system, a supply circuit, a load circuit, current limiting means, a circuit breaker operative when in its closed position to connect said current limiting means in series between said supply and load circuits, closing means for said circuit breaker, and a relay for controlling said closing means having a winding connected in series with said current limiting means and another winding so connected as to be responsive to the difference between the voltages of said supply and load circuits.

5. In an automatic reclosing circuit breaker system, a supply circuit, a load circuit, current limiting means arranged to be connected in series with said supply and load circuits, a circuit breaker arranged to short circuit said current limiting means, means responsive to the current through said current limiting means for successively short circuiting portions of said current limiting means, and means responsive to the voltage difference between said supply and load circuits for controlling the closing of said circuit breaker.

6. In an automatic reclosing circuit breaker system, a supply circuit, a load circuit, current limiting means arranged to be connected in series with said supply and load circuits, a circuit breaker arranged to short circuit said current limiting means, means responsive to the current through said current limiting means for successively short circuiting portions of said current limiting means, closing means for said circuit breaker, a relay for controlling said closing means having a winding arranged to be energized when said circuit breaker is closed and another winding arranged to be energized in accordance with the voltage difference between said supply and load circuits when said circuit breaker is open.

7. In an automatic reclosing circuit breaker system, a supply circuit, a load circuit current limiting means, a circuit breaker arranged when closed to connect said current limiting means in series between said supply circuit and load circuit, a second circuit breaker arranged when closed to short circuit said current limiting means, means for effecting the opening of said second mentioned circuit breaker when an abnormal condition occurs on said load circuit, and means for controlling the operation of said first mentioned circuit breaker in response to the current through said current limiting means when said second mentioned circuit breaker is open and in response to the voltage difference between said supply circuit and said load circuit when said first mentioned circuit breaker is open.

8. In an automatic reclosing circuit breaker system, a supply circuit, a load circuit, current limiting means, a circuit breaker arranged when closed to connect said current limiting means in series between said supply circuit and load circuit, a second circuit breaker arranged when closed to short circuit said current limiting means, means for effecting the opening of said second mentioned circuit breaker when an abnormal condition occurs on said load circuit, means responsive to the current through said current limiting means for short circuiting portions of said current limiting means, electro-responsive closing means for said first mentioned circuit breaker, a circuit for said electro-responsive closing means, a relay for controlling the circuit of said electro-responsive closing means, having a coil connected and arranged so as to be energized in accordance with the current through said current limiting means when said first mentioned circuit breaker is closed and all of said current limiting means is connected in series between said supply and load circuits, and a coil connected and arranged so as to be energized in accordance with the voltage difference between said supply circuit and said load circuit when said first mentioned circuit breaker is open, and means responsive to the voltage difference between the supply circuit and the load circuit for controlling the closing of said second mentioned circuit breaker.

9. In an automatic reclosing circuit breaker system, a supply circuit, a load circuit, a circuit breaker adapted to connect said supply circuit to said load circuit, means responsive to a predetermined abnormal condition of said load circuit for effecting the opening of said circuit breaker, means controlled in accordance with a predetermined electrical condition of said load circuit for effecting the closing of said circuit breaker when said circuit breaker is open, and means operative after said circuit breaker has been open for a predetermined length of time for automatically effecting the closing of said circuit breaker irrespectively of said electrical condition of said load circuit.

10. In an automatic reclosing circuit breaker system, a supply circuit, a load circuit, a circuit breaker arranged to connect said supply circuit to said load circuit, means responsive to a predetermined abnormal condition of said load circuit for effecting the opening of said circuit breaker, means responsive to the voltage difference between said supply circuit and said load circuit when said circuit breaker is open for controlling the closing of said circuit breaker, and means operative after the circuit breaker has been open for a predetermined length of time for effecting the closing of said circuit breaker irrespectively of the voltage difference between said supply circuit and said load circuit.

11. In an automatic reclosing circuit breaker system, a supply circuit, a load circuit, a circuit breaker arranged to connect said circuits together, current limiting means arranged to be connected in series with said circuits when said circuit breaker is open and to be short circuited by said circuit breaker when it is closed, means for opening said circuit breaker in response to a predetermined abnormal condition on said load circuit, means for decreasing the current limiting effect of said current limiting means when the load is less than a predetermined value after the opening of said circuit breaker, and means controlled by the current supplied through said current limiting means subsequent to the operation of said load responsive means for effecting the closing of said circuit breaker.

12. In an automatic reclosing circuit breaker system, a supply circuit, a load circuit, a circuit breaker for connecting said circuits together, current limiting means adapted to be connected in series with said circuits when said circuit breaker is open and to be short circuited by said circuit breaker when it is closed, means responsive to a predetermined abnormal condition on said load circuit for opening said circuit breaker, and means responsive to the current through said current limiting means for short circuiting a portion of said current limiting means and for controlling the closing of said circuit breaker.

13. In an automatic reclosing circuit breaker system, a supply circuit, a load circuit, a circuit breaker for connecting said circuits together, current limiting means adapted to be connected in series with said circuits when said circuit breaker is open and to be short circuited by said circuit breaker when it is closed, means responsive to a predetermined abnormal condition on said load circuit for opening said circuit breaker, means responsive to the current through said current limiting means for successively short circuiting portions thereof, and means operative independently of said current responsive means for effecting the closing of said circuit breaker whenever the voltage difference between said circuits is less than a predetermined value.

14. In an automatic reclosing circuit breaker system, two electric circuits, a current limiting means, a circuit breaker arranged when closed to connect said current limiting means in series between said circuit, a second circuit breaker for connecting said circuits together independently of said current limiting means, means responsive to a predetermined abnormal condition on one of said circuits for effecting the opening of said circuit breakers, means for effecting the closing of said first mentioned circuit breaker to connect said current limiting means in series between said circuits, means responsive to the current through said current limiting means for effecting the short circuiting of a portion of said current limiting means, and means responsive to the voltage difference between said circuits for effecting the closing of said second circuit breaker.

15. In an automatic reclosing circuit breaker system, two circuits, current limiting means, a circuit breaker arranged when in its closed position to connect said current limiting means in series between said circuits, a relay arranged to effect the closing of said circuit breaker when the voltage difference between said circuits is below a predetermined value and the opening of said circuit breaker when the current through said current limiting means exceeds a predetermined value, and means for short circuiting said current limiting means when the voltage drop across it is below a predetermined value.

16. In combination, two electric circuits, current limiting means arranged to be connected in series with said circuits, and means for short circuiting said current limiting means when the current through said current limiting means decreases below a predetermined value comprising a relay having a winding connected so as to be responsive to the current through said current limiting means, and a second winding arranged to be energized to prevent said relay from operating to effect the short circuiting of said current limiting means until a predetermined condition occurs on one of said circuits.

17. In combination, two electric circuits, current limiting means arranged to be connected in series with said circuits, and means for short circuiting said current limiting means when the current through said current limiting means decreases below a predetermined value comprising a relay having a winding connected so as to be responsive to the current through said current limiting means and a second winding connected so as to be energized before said current limiting means is connected in series with said circuits to cause said relay to be in such a position as not to effect the short circuiting of said current limiting means at the instant it is connected in series with said circuits, and means for effecting the deenergization of said second winding.

18. In combination, two electric circuits, current limiting means in series with said circuits, a circuit breaker for short circuiting said current limiting means, means for effecting the opening of said circuit breaker, a relay for controlling the closing of said circuit breaker comprising a winding connected so as to be responsive to the current through said current limiting means, a second winding for said relay, and a circuit for said second winding arranged to be completed by said circuit breaker when in its closed position so that said relay is maintained in such a position as not to effect the short circuiting of said current limiting means at the instant said circuit breaker is opened.

In witness whereof, I have hereunto set my hand this 24th day of December, 1923.

WILLIAM S. H. HAMILTON.